United States Patent
Kalakrishnan et al.

(10) Patent No.: US 12,387,346 B2
(45) Date of Patent: *Aug. 12, 2025

(54) OBJECT POSE NEURAL NETWORK SYSTEM

(71) Applicant: Google LLC, Mountain View, CA (US)

(72) Inventors: Mrinal Kalakrishnan, Palo Alto, CA (US); Adrian Ling Hin Li, San Francisco, CA (US); Nicolas Hudson, San Mateo, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,998

(22) Filed: Apr. 5, 2023

(65) Prior Publication Data

US 2024/0078683 A1   Mar. 7, 2024

Related U.S. Application Data

(60) Continuation of application No. 17/114,083, filed on Dec. 7, 2020, now Pat. No. 11,625,852, which is a
(Continued)

(51) Int. Cl.
*G06T 7/246* (2017.01)
*G06T 7/11* (2017.01)
(Continued)

(52) U.S. Cl.
CPC ............. *G06T 7/246* (2017.01); *G06T 7/11* (2017.01); *G06T 7/60* (2013.01); *G06T 7/73* (2017.01);
(Continued)

(58) Field of Classification Search
None
See application file for complete search history.

(56) References Cited

U.S. PATENT DOCUMENTS

| | | | | |
|---|---|---|---|---|
| 8,385,687 B1 * | 2/2013 | Blais-Morin | ........... | G06T 7/337 382/293 |
| 2015/0213328 A1 * | 7/2015 | Mase | ...................... | G06F 18/22 382/201 |

(Continued)

FOREIGN PATENT DOCUMENTS

| WO | WO-2014200742 A1 * | 12/2014 | ........... G06K 9/3233 |
|---|---|---|---|
| WO | WO-2015069824 A2 * | 5/2015 | ......... G06K 9/00147 |

(Continued)

OTHER PUBLICATIONS

Bach S, Binder A, Montavon G, Klauschen F, Müller KR, Samek W. On Pixel-Wise Explanations for Non-Linear Classifier Decisions by Layer-Wise Relevance Propagation. PLoS One. Jul. 10, 2015;10(7):e0130140. doi: 10.1371/journal.pone.0130140. PMID: 26161953; PMCID: PMC4498753.*

*Primary Examiner* — Jiangeng Sun
(74) *Attorney, Agent, or Firm* — McDonnell Boehnen Hulbert & Berghoff LLP

(57) ABSTRACT

Methods, systems, and apparatus, including computer programs encoded on a computer storage medium for predicting object pose. In one aspect, a method includes receiving an image of an object having one or more feature points; providing the image as an input to a neural network subsystem trained to receive images of objects and to generate an output including a heat map for each feature point; applying a differentiable transformation on each heat map to generate respective one or more feature coordinates for each feature point; providing the feature coordinates for each feature point as input to an object pose solver configured to compute a predicted object pose for the object, wherein the predicted object pose for the object specifies a position and
(Continued)

an orientation of an object; and receiving, at the output of the object pose solver, a predicted object pose for the object in the image.

10 Claims, 6 Drawing Sheets

Related U.S. Application Data division of application No. 15/410,702, filed on Jan. 19, 2017, now Pat. No. 10,861,184.

(51) Int. Cl.

| | |
|---|---|
| *G06T 7/60* | (2017.01) |
| *G06T 7/73* | (2017.01) |
| *G06V 10/42* | (2022.01) |
| *G06V 10/75* | (2022.01) |
| *G06V 10/82* | (2022.01) |
| *G06V 20/10* | (2022.01) |
| *G06V 30/186* | (2022.01) |
| *G06V 30/19* | (2022.01) |
| *G06V 30/194* | (2022.01) |

(52) U.S. Cl.
CPC ............ *G06V 10/42* (2022.01); *G06V 10/758* (2022.01); *G06V 10/82* (2022.01); *G06V 20/10* (2022.01); *G06V 30/186* (2022.01); *G06V 30/19173* (2022.01); *G06V 30/194* (2022.01); *G06T 2207/10004* (2013.01); *G06T 2207/20084* (2013.01); *G06T 2207/30244* (2013.01)

(56) References Cited

U.S. PATENT DOCUMENTS

| | | | |
|---|---|---|---|
| 2017/0083752 A1* | 3/2017 | Saberian | G06V 10/764 |
| 2017/0124415 A1* | 5/2017 | Choi | G06T 7/73 |
| 2018/0060701 A1* | 3/2018 | Krishnamurthy | G06N 3/045 |
| 2018/0165548 A1* | 6/2018 | Wang | G06F 18/214 |
| 2018/0342050 A1* | 11/2018 | Fitzgerald | G06T 7/0002 |
| 2019/0114743 A1* | 4/2019 | Lund | G06V 30/1444 |

FOREIGN PATENT DOCUMENTS

| | | | | |
|---|---|---|---|---|
| WO | WO-2016132371 A1 * | 8/2016 | | G06F 3/00 |
| WO | WO-2018045031 A1 * | 3/2018 | | A61M 1/28 |
| WO | WO-2018156133 A1 * | 8/2018 | | G01N 33/4833 |
| WO | WO-2020163908 A1 * | 8/2020 | | G06K 9/00335 |

* cited by examiner

300 

Receive an image of an object having one or more feature points
310

↓

Provide image as input to neural network subsystem configured to generate heat maps for one or more feature points of the object
320

↓

Apply differentiable transformation on heat maps to obtain feature coordinates for the one or more feature points
330

↓

Provide feature coordinates to object pose solver
340

↓

Receive predicted object pose at the output of object pose solver
350

FIG. 3

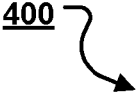

400

↓

Obtain images of the object in a particular environment
410

↓

Obtain a ground truth object pose of the object in each image
420

↓

Obtain a predicted object pose of the object in each image
430

↓

Update weights of the neural network system by performing backpropagation through all layers of the system using the error between the ground truth object pose and the predicted object pose
440

FIG. 4

OBJECT POSE NEURAL NETWORK SYSTEM

CROSS REFERENCES TO RELATED APPLICATION

This application is a continuation of, and claims priority to, pending U.S. patent application Ser. No. 17/114,083, filed on Dec. 7, 2020, entitled "Object Pose Neural Network System," which is a divisional application of, and claims priority to, U.S. patent application Ser. No. 15/410,702, filed on Jan. 19, 2017, now U.S. Pat. No. 10,861,184, granted on Dec. 8, 2020, entitled "Object Pose Neural Network System." The disclosure of the foregoing applications are incorporated herein by reference in their entirety.

BACKGROUND

This specification relates to predicting an object pose using neural network systems.

In general, an object pose indicates a position and an orientation of an object. Computing an object pose is an important goal in computer-driven applications that seek to precisely manipulate objects for certain tasks. For example, in order to precisely position the end effector of a robotic arm to pick up a small object, the current object pose of the robotic arm may need to be computed with high accuracy.

Neural networks are machine learning models that employ one or more layers of nonlinear units to predict an output for a received input. Some neural networks include one or more hidden layers in addition to an output layer. The output of each hidden layer is used as input to another the next layer in the network, i.e., the next hidden layer or the output layer. Each layer of the network generates an output from a received input in accordance with current values of a respective set of parameters.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameter values can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more parameters that define one or more filters for each layer, with each filter having one or more parameters. A convolutional neural network layer generates an output by performing a convolution of each neuron's filter with the layer's input.

SUMMARY

This specification describes how a system can compute a predicted object pose of an object using a neural network system. To do so, the system processes observations about the environment of the object through a neural network subsystem to generate heat maps about occurrence of one or more features points of the object in the observations. From these heat maps, the system can solve for an object pose for the object with high accuracy.

In general, one innovative aspect of the subject matter described in this specification can be embodied in computer-implemented methods that include the actions of receiving an image of an object having one or more feature points; providing the image as an input to a neural network subsystem trained to receive images of objects and to generate an output including a heat map for each of the one or more feature points, wherein each heat map represents a likelihood for each image region of a plurality of image regions in the image that the image region corresponds to a respective one of the one or more feature points; applying a differentiable transformation on each heat map to generate one or more respective feature coordinates for each of the one or more feature points; providing the one or more feature coordinates for each of the one or more feature points as input to an object pose solver configured to compute a predicted object pose for the object, wherein the predicted object pose for the object specifies a position and an orientation of an object; and receiving, at the output of the object pose solver, a predicted object pose for the object in the image.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Implementations can include one or more of the following features. In some implementations, one or more feature points each correspond to a feature marker in an environment of the object. In some implementations, the neural network subsystem includes one or more convolutional neural network layers. In some implementations, the object is an end effector of a robotic arm. In some implementations, the object pose solver is configured to compute a predicted object pose for the object from the feature coordinates using a least squares regression analysis procedure.

In some implementations, applying the differentiable transformation on each heat map includes applying a soft argmax function to one or more values of each respective heat map to generate a location of a measure of central tendency of values in the heat map and generating the respective one or more feature coordinates for the respective feature point corresponding to each respective heat map based on the location of a measure of central tendency of values in the heat map.

In some implementations, the methods include the actions of generating a measure of variance for each feature coordinate from the computed locations of the measure of central tendency of values in the respective heat maps and providing the measure of variance for each feature coordinate to the object pose solver, wherein the object pose solver computes the predicted object pose by giving more weight to feature coordinates having a lower variance.

In some implementations, applying the differentiable transformation to generate one or more respective feature coordinates for each of the one or more feature points includes applying a curve fitting procedure to the values in the heat maps and computing the respective feature coordinates based on respective locations of peaks of the curves output by the curve fitting procedure.

In some implementations, the methods include the actions of obtaining images of an object in a particular environment; determining that a particular image contains high-quality pose information for the object; and, in response to determining that the particular image contains high-quality pose information for the object, generating a ground truth object pose based on the high-quality pose information, obtaining a predicted pose of the object in the particular image; and training a neural network system using a measure of error between the ground truth object pose of the object in the particular image and the predicted object pose in the particular image. In some implementations, obtaining the predicted pose of the object in the particular image includes processing the particular image through a neural network system to generate the predicted object pose for the object in the particular image.

In some implementations, the methods include the actions of determining that a second particular image does not contain high-quality pose information for the object and, in response, generating a ground truth object pose for object in the second particular image based on one or more other images of the object that contain high-quality pose information for the object. In some of those implementations, generating the ground truth object pose for the object in the second particular image based on one or more other images of the object includes obtaining respective ground truth object poses of the object based on the high-quality pose information contained in the in each of the one or more other images; computing one or more respective relative displacements using kinematic data associated with the image and respective kinematic data associated with each of the one or more other images; and computing an interpolated ground truth object pose of the object based on the respective ground truth objects pose of the object in each of the one or more other images and the one or more respective relative displacements. In some implementations, computing the one or more respective relative displacements includes computing differences in respective values of one or more connecting angles of the object at respective times associated with the image and each of the one or more other images.

In some implementations, the methods include the actions of obtaining a pair of images of a particular environment of an object, each of the pair of images being associated with respective kinematic data; computing, for each of the pair of images, a respective predicted object pose in the respective image; computing a difference between a displacement of the predicted object poses and a displacement indicated by the kinematic data; and training a neural network system using an error between the displacement of the predicted object poses and a displacement indicated by the kinematic data. In some of those implementations, each respective kinematic data associated with a respective image is determined based on respective values of one or more connecting angles of the object at a time of the respective image.

Particular embodiments of the subject matter described in this specification can be implemented so as to realize one or more of the following advantages. By training a neural network to generate heat maps and by using a differentiable object pose solver to generate a final object pose, the system can be trained end-to-end. This means that the training errors in the predicted object poses can be successfully backpropagated through the entire system. In addition, by first generating heat maps and then using the heat maps to predict object pose, the system can use intermediate supervision of the heat maps, which drastically improves the efficiency of training the neural network system. These techniques make the system more accurate and cheaper to train than a neural network system that attempts to generate an object pose as an output.

One use case for such a system is to compute pose predictions for a robotic arm. By using the system to generate a predicted object pose from image data, the pose of the robotic arm can be computed accurately even when the robotic arm is constructed with low-cost materials that cause integrated kinematic sensors to have inherent errors in their kinematic measurements of the arm's pose. The speed and accuracy of solving for the final object pose can be improved by using the kinematic measurements as an initial condition.

The system can automatically generate large amounts of training data by using high-quality observations using a fiducial marker attached to an object. Even though many training images may not include high-quality pose information, e.g., when the fiducial marker is not visible, the system can still use other high-quality observations to interpolate the ground truth object poses for training. As such, the large amounts of automatically generated training data makes neural network systems used to predict object poses more accurate and cheaper to train.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an example process for predicting an object pose.

FIG. 4 is an example process for training a neural network system to predict an object pose using interpolative calculations.

DETAILED DESCRIPTION

This specification describes how a neural network system can be used to compute a predicted object pose as well as how training data for such a system can be automatically generated.

Figure 1:
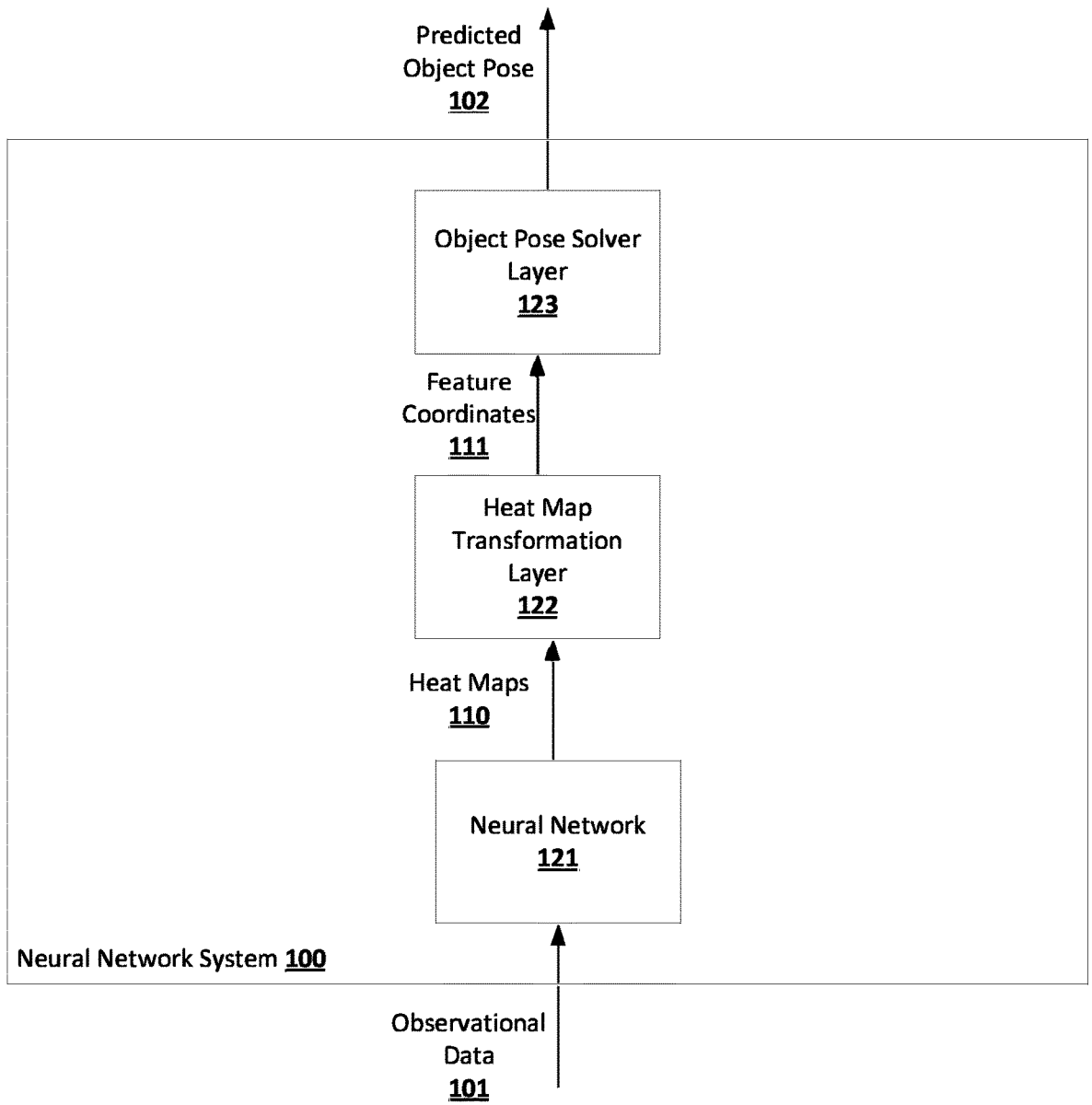
FIG. 1 is a diagram that illustrates an example neural network system.

FIG. 1 illustrates an example neural network system 100. The system 100 is an example of a system implemented as computer programs installed on one or more computers in one or more locations, on which the systems, components, and techniques described below can be implemented.

At a high level, the system 100 receives observational data 101 for an object as input and generates a predicted object pose 102 for the object as output. The input observational data 101 includes images of the object in an environment of the object. The output predicted object pose 102 specifies a position and an orientation of the object as predicted by the system 100.

To generate predicted object poses 102 from observation data 101, the system 100 uses a neural network 121, a heat map transformation layer 122, and an object pose solver layer 123.

The input observational data 101 can be captured by a camera subsystem that can be external to or integrated with the neural network system 100. For example, the camera subsystem can continually capture images of the object and provide each image as input observational data 101.

The neural network 121 can process the observational data 101 through one or more neural network layers to generate one or more heat maps 110. The one or more layers of the neural network 121 may include an input layer, an output layer, and one or more hidden layers. Each of the layers of the neural network 121 includes one or more neural network nodes that process (for nodes of the input layer) the input to the neural network 121 or (for nodes of hidden or output layers) the output of a preceding layer of the neural network 121. Each node generates an output that is supplied either (for nodes of the input and hidden layers) to one or more nodes of a subsequent layer of the neural network or (for nodes of the output layer) to the neural network 121. The one or more layers of the neural network 121 may include one or more convolutional neural network layers, one or more fully connected layers, or both.

Each heat map of the heat maps 110 is data that represents a mapping between regions of a feature space in the observational data 101 to respective scores, with each score representing a likelihood that each region corresponds to a particular feature point in the environment of the object. For example, a heat map 110 can include data that maps a plurality of regions of an image, e.g., each pixel, to respective scores representing a likelihood that each region corresponds to a particular feature point. In some implementations, the predicted feature points correspond to visually distinguishable points on the object. The feature points can be made intentionally visually distinguishable with reflective paint or other markers, or the feature points can correspond to natural properties of the object, e.g., a handle on a mug. The feature points however need not correspond to points on the object itself. For example, the feature points can be defined to be points that lie within the space between two segments of an object, e.g., the space defined by a handle on a mug.

The heat map transformation layer 122 can transform each of the heat maps 110 into one or more feature coordinates 111. The feature coordinates 111 generated by the heat map transformation layer 122 for a heat map can define a single representative point for the feature point computed from the scores in the heat map. In some implementations, the heat map transformation layer 122 can also generate a variance value for the computed feature coordinates 111 of each feature point. Each variance value indicates a measure of certainty for the feature coordinates generated for the feature point.

Figure 2:
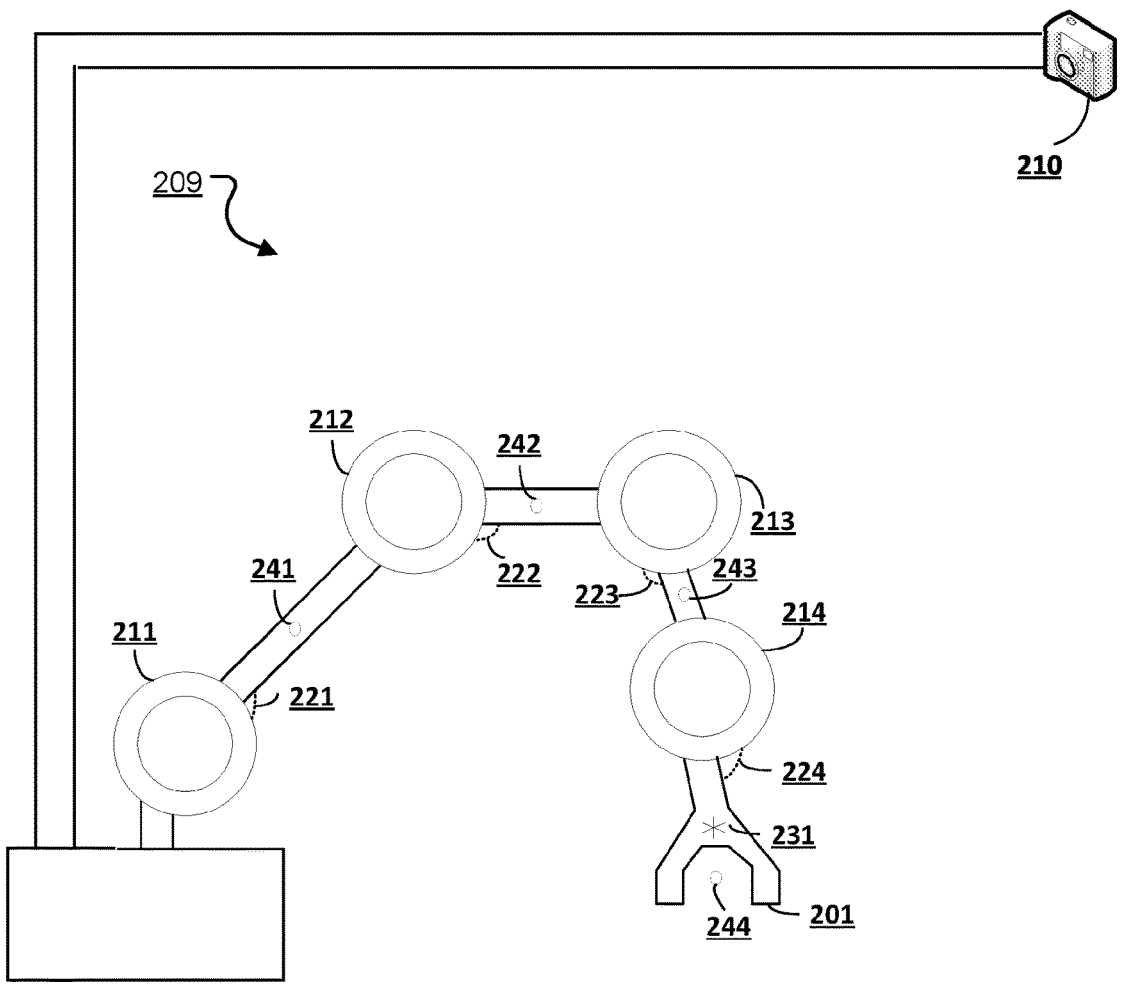
FIG. 2 illustrates an example environment of a robotic arm end effector.

The feature coordinates 111, and optionally, variances for each of the feature points, can be provided as input to the object pose solver layer 123. The object pose solver layer 122 can perform an analysis procedure on the feature coordinates 111 to solve for the predicted object pose 102. In some implementations, the system 100 can provide the object pose solver layer 122 with initial conditions for solving for the object pose from the feature coordinates 111. For example, when computing an object pose for a robotic arm having kinematic sensors, the system can provide the kinematic measurements from the kinematic sensors as an initial condition even if the actual kinematic measurements as somewhat unreliable FIG. 2 illustrates an example environment 200 of a robotic arm end effector 201. The robotic arm end effector 201 is an example of an object whose predicted object pose can be computed from as input observational data of the environment 200 using a neural network system, e.g., the neural network system 100 of FIG. 1.

The environment 200 includes a robotic arm 209 and a camera 210. The camera 210 records images of the environment 200 that can be provided as input observational data to the neural network system.

The robotic arm 209 includes four joints 211-214. Each joint is associated with an angle 221-224, which is a kinematic indicator of the position of the end effector 201. Integrated kinematic sensors can provide measurements of the angles 221-224. However, due to joint slack and other manufacturing imperfections, these measurements are often not sufficiently accurate for the end effector 201 to perform tasks that require any precision.

The environment 200 of the robotic arm 209 includes feature points 241-244. The feature points 241-243 are on the robotic arm 209, while the feature point 244 is not on the robotic arm. The feature points 241-244 can (but need not be) visually distinguished from the rest of the arm 209 by special paint or other markings. When generating training data, the end effector 201 can include a fiducial marker 231. The neural network system can use the fiducial marker to generate high-quality pose data for the end effector 201. Alternatively, or in addition, the neural network system can generate training data by computing a difference between kinematic measurements generated by the kinematic sensors. These techniques are described in more detail below with reference to FIGS. 5-6.

FIG. 3 is a flow chart of an example process 300 for predicting an object pose. The process can be implemented by one or more computer programs installed on one or more computers. The process will be described as being performed by a system of one or more computers, e.g., the neural network system 100 of FIG. 1.

The system receives an image of an object having one or more feature points (310). The image will generally depict the object in an environment of the object. In other words, the image contains image data for the object, as well as image data for other things that are not the object.

The system provides the image as an input to a neural network subsystem to generate heat maps for one or more feature points of the object (320). The neural network subsystem is trained to receive images of objects and to generate respective heat maps for each of the feature points of the object in the image. A heat map for a feature point maps each region of the image to a score representing a likelihood that the region corresponds to the feature point. The system applies a differentiable transformation on each heat map to generate one or more feature coordinates for each of the one or more feature points (330). The transformation being differentiable allows the system to be trained end-to-end using stochastic gradient descent with backpropagation, a technique that requires computing partial derivatives.

The system can use any appropriate differentiable transformation that transforms the values of each heat map into one or more representative feature coordinates. In some implementations, the system applies a soft argmax function to the values of the heat map. The soft argmax function is a smooth approximation of a hard argmax function. Unlike a hard argmax function, the soft argmax function can generate a differentiable output at all continuous points for all values of the heat maps. The soft argmax function can use the scores in the heat map to compute the location in the heat map of a measure of central tendency, e.g., a mean, of the data in the heat map. The system can then compute the feature coordinates from the location of the measure of central tendency of the data in the heat map. In some implementations, the system applies a soft argmax function to values of a heat map by: (1) first, applying a spatial softmax function $s_{cij} = e^{\alpha_{cij}} / \Sigma_{i,j} e^{\alpha_{cij}}$, to the heat map $\alpha_{cij}$, where c, i, and j represent the index, height, and width of the heat map respectively, to generate a probability distribution over the location of a feature marker corresponding to the heat map in an input image; (2) processing the probability distribution to calculate the estimated x and y coordinate of the feature marker in the input image using the equations $f_{cx} = \Sigma_{ij} s_{cij} x_{ij}$, $f_{cy} = \Sigma_{ij} s_{cij} y_{ij}$ where $x_{ij}$, $y_{ij}$ are the positions of the x and y coordinates in the input image respectively.

The system can also use the computed measure of central tendency calculate a measure of variance for the computed location of the measure of central tendency. As described above, an object pose solver can use the computed variance to give more weight to some feature coordinates than others when generating a predicted object pose.

In some other implementations, the system can apply a differentiable transformation using curve fitting. In general, the system can perform a curve fitting procedure to the values in the heat maps and then use the locations of the peaks of the resulting curves to obtain values for the feature coordinates. For example, the system can generate a Gaussian profile of the values of the heat map and calculate a location of the center of the output of the Gaussian profile. The system can then use the location of the center of the output of the Gaussian profile to compute feature coordinates, and optionally, a variance for the feature coordinates. For example, the system can apply a Gaussian transformation function to the data values of each heat map. The system can then calculate a location of the center of the output of the data values based on the results of applying the Gaussian transformation function. When using the Gaussian center of a heat map to determine the feature coordinates, the system can compute feature coordinates that fall outside the image. Therefore, in some situations the Gaussian center may result in more accurate feature coordinates than those generated by a soft argmax function.

The system provides the feature coordinates for each feature point as an input to an object pose solver (340). The object pose solver is configured to process the feature coordinates to generate a predicted object pose for the object. For example, the object pose solver can perform a least squares analysis based on the feature coordinates for each feature point. In general, the operations of the object pose solver are also differentiable, which allows the system to be trained end-to-end.

In some implementations, the object pose solver uses the variance associated with the coordinates of each feature point to solve for the object pose. In doing so, the object pose solver layer can give more weight to feature coordinates with lower variance and thus lower uncertainty than to feature coordinates with high variance and thus higher uncertainty.

The system receives the output of the object pose solver, which is a predicted object pose for the object in the image (350). As described above, the predicted object pose indicates a position and an orientation of the object in a particular coordinate system.

FIG. 4 is a flow chart of an example process 400 for training a neural network system to predict an object pose. The process can be implemented by one or more computer programs installed on one or more computers. The process will be described as being performed by a system of one or more computers, e.g., the neural network system 100 of FIG. 1.

The system obtains images of the object in a particular environment (410). The images of the object can be two-dimensional or three-dimensional images.

The system can obtain large quantities of images by continuously capturing camera data of the object in various poses. The system can also obtain the images from recorded video data of the object as it moves from pose to pose The system obtains a ground truth object pose of the object in each image (420). The ground truth object pose for an image is data that specifies a high-quality object pose for the object in the image.

The system can obtain the ground truth object poses in a number of ways. For example, the system can provide the images of the object to human labelers, who can label each image with a ground truth object pose. This technique results in high-quality ground truth object pose indications.

The human-labeled data can also provide for robust object pose predictions even for many different kinds of objects in a particular object class, e.g., many different kinds of teapots. For example, the system can obtain images of not just one object, but multiple objects within a particular object class. The system can then provide all the images of the object in the object class to human labelers, who can provide the ground truth object poses.

However, obtaining ground truth object poses with human input on a massive scale may be costly or impractical. Thus, for some objects the system can obtain ground truth object poses using automated processes. Two such example processes are described in more detail below with reference to FIGS. 5-6.

The system obtains a predicted object pose of the object in each image (430). The system can obtain the predicted pose by performing a forward pass through a neural network system using each image as described above with reference to FIG. 3. The result is a predicted object pose that specifies a position and an orientation of the object.

The system updates weights of the neural network system by performing backpropagation through all layers of the system using the error between the ground truth object pose and the predicted object pose (440). For example, the system can perform backpropagation through each layer of the neural network system using stochastic gradient descent. The system uses the gradient to update the parameters of one or more units in each of its layers.

The system can backpropagate through all the layers because all the layers perform differentiable operations on their respective input values. In particular, the system can perform backpropagation by computing partial derivatives for the error in the computed feature coordinates from the object pose solver layer as well as between the object pose solver layer and the heat map transformation layer. The system can then continue to perform backpropagation through the heat map transformation layer and through all layers of the neural network. As such, the system can be trained end-to-end without having to build a neural network that outputs the object pose directly.

The system can also improve the efficiency of the training process by using some degree of intermediate supervision for the heat maps that are generated by the system. In other words, instead of trying to learn optimal heat maps from scratch, the training process can use particular input parameters of the heat maps that specify what kinds of heat maps the system should learn. The input parameters can include a range of values for each point of the heat map and a range of acceptable widths for values generated within the heat maps. For example, the input parameters can direct the system to learn more sharply peaked heat maps rather than heat maps having a wider distribution. The types of heat maps that are appropriate will depend on the particular object pose application. For example, when the objects are likely to be highly similar, more sharply peaked heat maps may be more appropriate. However, when the objects are objects of a particular class, e.g., different kinds of tea cups, and are thus likely to be more dissimilar, less sharply peaked heat maps may be more ideal.

Figure 5:
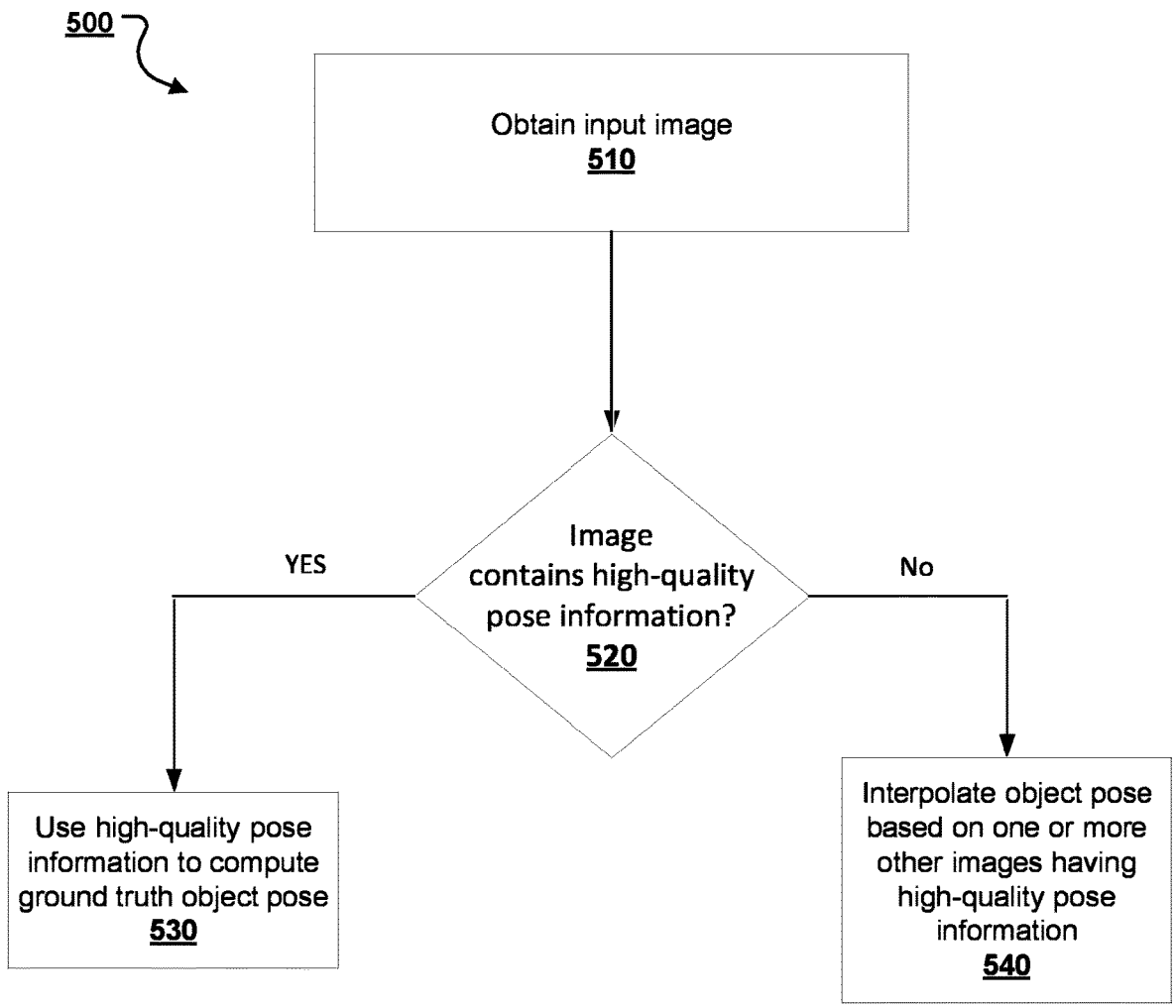
FIG. 5 is an example process for generating ground truth object pose.

FIG. 5 is a flow chart of an example process 500 for generating ground truth object poses using interpolative calculations. The process can be implemented by one or more computer programs installed on one or more computers. The process will be described as being performed by a system of one or more computers.

The system obtains an input image of the object (510). As described above, the system can continually obtain image or video data of the object moving through different poses.

The system determines if the input image contains high-quality pose information (520). During training, high-quality pose information is information that indicates an object pose that is independent of the feature points that are used as inputs to the neural network. For example, during training the object can have a fiducial marker attached to a predetermined location of the object. The fiducial marker can have markings, e.g., a high-contrast checkerboard pattern, from which an object pose can be reliably determined when a sufficient portion of the fiducial marker is visible in the image. Thus, when using a fiducial marker, an input image contains high-quality pose information if the image contains a sufficient portion of the fiducial marker to compute a ground truth object pose from the fiducial marker. If the system determines that the input image contains high-quality pose information, the system uses the high-quality pose information to compute ground truth object pose (530). The ground truth object pose for an input image can include values for the position and orientation of the object in the input image.

In some implementations, the system computes the ground-truth position of the object using a fiducial marker by calculating an estimated three-dimensional position of the fiducial marker through image and depth information provided by a stereo camera. The system then uses the estimated position of the fiducial marker and information about positioning of the fiducial marker relative to the object to compute the ground-truth three-dimensional position of the object.

In some implementations, the system computes the ground truth orientation of the object using a fiducial marker by calculating an estimated orientation of the fiducial marker and using the information about the relative orientation of the fiducial marker and the object to compute the ground truth orientation of the object. For instance, the system can calculate the estimated position of the fiducial marker using information about the position of one or more other fiducial markers or information about the angles of one or more checkboards in a checkboard pattern marking the fiducial marker.

However, as the object moves around, high-quality pose information is not always available within images of the object. For example, the fiducial marker on the object can be obscured by parts of the object or the image can be a low-quality, e.g., blurry, image of the fiducial marker. In these situations, the system can compute the ground truth object poses in a different way.

Thus, if the system determines that the input image does not contain high-quality pose information, the system interpolates the ground truth object pose for the image based on one or more other images having high-quality pose information (540).

In some implementations, the system performs the interpolative calculations based on both of: (i) ground truth object poses of the object in each of one or more other images having high-quality pose information; and (ii) kinematic data representing the displacement of the object between the times of the input image and the one or more other images having high-quality pose information.

In some implementations, the system generates kinematic data representing the displacement of object between two or more times based on differences in respective values of one or more connecting angles of the object at each of the two or more times. A connecting angle of an object can be the angle with which any two or more portions of the object are connected to each other. Examples of a connecting angle include the joint angles of a robotic arm e.g., angles of the joints 211-214 of the robotic arm 209 of FIG. 2.

Although kinematic data generated by integrated object sensors may not be reliable enough for obtaining absolute ground truth object poses, the system can nevertheless use the kinematic data to generate reliable measures of relative object displacement between the two or more other images. In other words, while the kinematic data itself may be unreliable in the absolute sense, the kinematic data can be reliable enough in a relative sense to compute a ground truth object pose when combined with ground truth object poses computed from the other images. Thus, the system can combine the ground truth object pose computed from an image having high-quality pose information with a relative displacement of the object obtained from the kinematic data.

The system can compute an interpolated ground truth object pose for a particular image that is near one or more other images in time that have high-quality pose information. To do so, the system can obtain the kinematic data associated with each of the images. The system can then compute a relative displacement between the kinematic data associated with one or more other images and the kinematic data for the particular image. When using just one other image, the system can compute the interpolated object pose as a backward-in-time or a forward-in-time interpolation, e.g., through the application of a Kalman filter. When using two other images, the system can compute the interpolated object pose both backward-in-time and forward-in-time, e.g., through the application of a Kalman smoother.

For example, the system can interpolate the ground truth object pose of an end effector of a robotic arm, e.g., the end effector 201 of the robotic arm 209 of FIG. 2, in an input image that does not contain high-quality pose information. To do so, the system can use the ground truth object pose in one or more other images that include high-quality pose information as well as the kinematic data about the displacement of the end effector between images. The system can compute the displacement based on the joint angles of one or more joints of a robotic arm, e.g., the joints 211-214 of the robotic arm 209 of FIG. 2.

Figure 6:
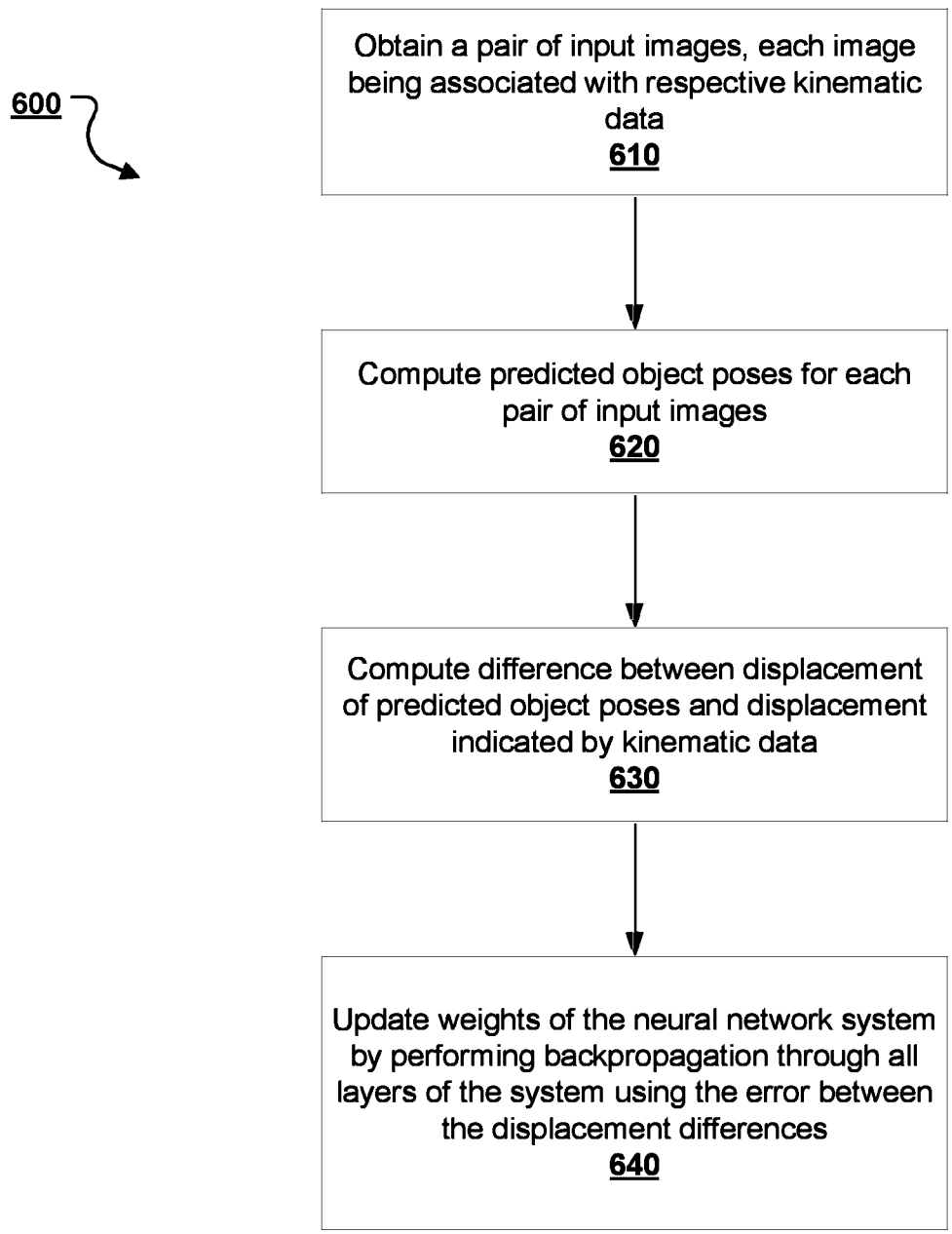
FIG. 6 is an example process for training a neural network system to predict an object pose using kinematic calculations.

FIG. 6 is a flow chart of an example process 600 for training a neural network system to predict an object pose using kinematic data. The example process in FIG. 6 is an additional method for automatically generating training data for training a neural network system to compute object poses. The process can be implemented by one or more computer programs installed on one or more computers. The process will be described as being performed by a system of one or more computers, e.g., the neural network system 100 of FIG. 1.

The system obtains a pair of inputs images (610). Each input image is associated with respective kinematic data. Examples of kinematic data for an input image include values determined by integrated sensors from the joint angles of one or more joints of a robotic arm, e.g., the joints 211-214 of the robotic arm 209 of FIG. 2, at the time of the input image.

The system computes predicted object poses for each image of the pair of the input images (620). The system computes the predicted pose by performing a forward pass in a neural network system, e.g., the neural network system 100 of FIG. 1, in accordance with the inputs provided by each image. For example, the system can perform the forward pass in accordance with the process described above with reference to FIG. 3.

The system computes the difference between displacement of the predicted object poses between the pair of images and a displacement of object poses as indicated by kinematic data (630). In other words, the system computes the difference between two measures of displacement: (i) a measure of displacement between the predicted object poses computed by the neural network system; (ii) the measure of displacement between object poses calculated using kinematic data of the image pair, e.g., as provided by integrated sensors of the object.

Even though kinematic data may not be reliable in an absolute sense, the kinematic data can nevertheless provide a reliable estimate of the displacement in object pose between the times of two input images. Therefore, the system can effectively compute a measure of ground truth displacement for the two images based on the kinematic data of the pair of images.

The system updates weights of the neural network system by performing backpropagation through all layers of the system using the error between the displacement differences (640). The system uses the difference between the ground truth displacement and the displacement of the predicted object poses as a loss function that can be minimized to train the neural network system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   receiving an image;
   providing the image as an input to a neural network system trained to generate an output comprising a plurality of heat maps corresponding to a plurality of feature points, each heat map representing a likelihood, for each image region of a plurality of image regions in the image, that the image region corresponds to a respective one of the plurality of feature points;

applying a differentiable transformation on each of the plurality of heat maps to generate a plurality of feature coordinates for the plurality of feature points, wherein applying the differentiable transformation on each heat map comprises:

applying a soft argmax function to one or more values of each respective heat map to generate a location of a measure of central tendency of values in the heat map; and generating a single feature point location within the image region corresponding to the heat map based on the location of the measure of central tendency of values in the heat map; and providing the plurality of feature coordinates for the plurality of feature points.

2. The method of claim 1, wherein the image is of a robot, and wherein the method further comprises controlling the robot based on the plurality of feature coordinates for the plurality of feature points.

3. The method of claim 2, wherein the plurality of feature points corresponds to a plurality of points of the robot.

4. The method of claim 1, further comprising generating a measure of variance for each feature location from the plurality of feature coordinates of the measure of central tendency of values in the respective heat maps.

5. The method of claim 1, further comprising:

applying a respective curve fitting procedure to each heat map, each curve fitting procedure for a heat map generating a function based on values in the heat map; and computing the plurality of feature coordinates based on respective locations of peaks of the function output by the curve fitting procedure.

6. The method of claim 1, wherein the image is of an object, wherein the method further comprises:

inputting the plurality of feature coordinates for the plurality of feature points into an object pose solver configured to compute a predicted object pose for the object, wherein the predicted object pose for the object specifies a position and an orientation of the object; and outputting the predicted object pose for the object.

7. The method of claim 6, wherein the object pose solver uses a least squares regression analysis procedure.

8. The method of claim 6, further comprising obtaining a ground truth pose for the object by:

obtaining respective ground truth object poses of the object based on pose information contained in each of one or more other images;

computing one or more respective relative displacements of the object using kinematic data associated with the image and respective kinematic data associated with each of the one or more other images; and computing an interpolated ground truth object pose of the object based on a respective ground truth pose of the object in each of the one or more other images and the one or more respective relative displacements.

9. The method of claim 1, wherein the plurality of feature points each correspond to a visually distinguishable portion of a robotic arm.

10. A computer-implemented method comprising:

receiving an image, wherein the image is of an object;

providing the image as an input to a neural network system trained to generate an output comprising a plurality of heat maps corresponding to a plurality of feature points, each heat map representing a likelihood, for each image region of a plurality of image regions in the image, that the image region corresponds to a respective one of the plurality of feature points;

applying a differentiable transformation on each of the plurality of heat maps to generate a plurality of feature coordinates for the plurality of feature points;

providing the plurality of feature coordinates for the plurality of feature points;

obtaining a ground truth pose for the object by:

obtaining respective ground truth object poses of the object based on pose information contained in each of one or more other images;

computing one or more respective relative displacements of the object using kinematic data associated with the image and respective kinematic data associated with each of the one or more other images; and computing an interpolated ground truth object pose of the object based on a respective ground truth pose of the object in each of the one or more other images and the one or more respective relative displacements;

inputting the plurality of feature coordinates for the plurality of feature points into an object pose solver configured to compute a predicted object pose for the object, wherein the predicted object pose for the object specifies a position and an orientation of the object; and outputting the predicted object pose for the object.

* * * * *